3,089,747
METHOD OF PREPARING RAYON PLISSÉ
Irvin H. Welch, Jr., Wilmington, Del., assignor to American Viscose Corporation, Philadelphia, Pa., a corporation of Delaware
No Drawing. Filed Apr. 4, 1958, Ser. No. 726,358
11 Claims. (Cl. 8—114.5)

This invention relates to a new method of treating rayon cloth, resulting in a new fabric and a method of producing it. The fabric, is in substance, plisséd rayon.

It is well known that cotton fabric can be given a plissé surface having the appearance of seersucker by printing a pattern thereon with caustic soda; this shrinks the fabric abnormally where the caustic soda has been applied, causing the untreated portions to pucker or crinkle. Unfortunately, the characteristics of viscose rayon work against successful use of these applications. Viscose threads are very easily deformed under slight tensions, especially when the moisture absorbed from the atmosphere or surrounding objects is above normal. As a result of this property, it was found that slight tensions such as would be encountered in wearing apparel will quickly remove the plissé effect. When the applications were made to urea formaldehyde treated fabrics, the plissé effect was somewhat more permanent but still was not satisfactory.

Accordingly, it is an object of the present invention to produce a rayon plissé which will not lose its plissé character even after the repeated washings and/or stretching to which an ordinary garment is subjected. According to the process of this invention, rayon plissé is formed by treating a rayon fabric with a composition which renders it capable of assuming a permanent plissé, followed by printing a pattern on the treated fabric with caustic soda by conventional means to give it the puckered or crinkled appearance which characterizes plissé. The base of the initial treating composition consists of a cellulose ether, a cross-linking aldehyde or derivative thereof, and a cross-linking catalyst. It also may contain a buffer, lubricant or softener, and a resin.

The cellulose ether is preferably of a water-soluble type containing free hydroxyl groups and may be a simple alkyl ether, carboxyalkyl ether, hydroxyalkyl ether, mixed alkyl hydroxyalkyl ether, mixed alkyl carboxyalkyl ether, or a water-soluble alkali metal salt of the cellulose ethers. This ether constitutes about 1–6% in parts by weight of the total weight of the solution. Hydroxyethyl cellulose having an average substitution of from about 1.4 to about 1.8 ethylene oxide group per anhydroglycose unit has been found to be very satisfactory for the purposes of this invention and is the preferred ether. Starch ethers are also operative.

The amount of aldehyde or derivative thereof in the solution may vary from about 1–10% by weight of the solution. Because they are non-toxic and lack the disagreeable odors usually associated with aldehydes, any of the polymeric acetal condensation products derived from polyoxyalkylene glycols and aldehydes disclosed and claimed in U.S. Patent 2,786,081 are preferred for the purposes of the present invention. These polymeric condensation products consist essentially of a reaction product of at least one dialkylene glycol (e.g. diethylene glycol) in which the alkylene radical contains 2 to 4 carbon atoms in a straight chain and at least one aliphatic aldehyde (e.g. formaldehyde) containing not more than 8 carbon atoms. The condensation product formed in this manner contains at least 2 dioxyalkylene radicals derived from said dialkylene glycol and at least 2 alkylidene radicals derived from said aldehyde.

Polymeric condensation products of this same type may also be made starting with dipropylene glycol, dibutylene glycols and higher dialkylene glycols, polyalkylene glycols, mixtures thereof, or their mixtures with diethylene glycol which are reactive with formaldehyde or other aldehydes to form water-soluble products or products which are dispersible in water, either alone or with the aid of appropriate adjuvants. Polyalkylene glycols, such as triethylene glycol, tetraethylene glycol, tripropylene glycol and the like, in which the alkylene groups contain from 2 to 3 carbon atoms in a straight chain, may also be used, either alone or in admixture with the aforementioned dialkylene glycols. Likewise polyols, such as glycerine, pentaerythritol and sorbital, which are aliphatic polyhydric alcohols having 3 to 6 carbon atoms and 3 to 6 hydroxyl groups, may be added to the alkylene glycols in amounts up to about 50 mol. percent of the glycols for reaction with the aldehyde for forming water-soluble or water-dispersible products. Instead of the paraformaldehyde of the above examples, trioxane, methylal, aqueous formalin and similar formaldehyde-generating compounds may be used. Instead of formaldehyde, other reactive aldehydes, such as acetaldehyde, propanal, butanal, glyoxal, and other dialdehydes, containing not more than 8 carbon atoms in the monomeric form, and mixtures thereof, may be used in forming water-soluble or water-dispersible condensation products with the alkylene glycols. The term "alkylene" is understood to include a doubly unsatisfied aliphatic radical containing a substituted or unsubstituted straight chain possessing from two to four carbon atoms in the chain and having its unsatisfied valences on either adjacent or separated carbon atoms.

In a preferred embodiment of the present invention, the condensation product of Example 1 of U.S. Patent 2,786,081 is utilized in a concentration of at least 5% by weight and preferably 6 to 9%. More than 10% by weight of this or any other aldehyde containing material may be used; in fact, 37% formaldehyde alone has been effectively utilized without damaging the regenerated cellulose fabric. Like amounts of other aldehyde-containing materials described herein may be utilized (i.e., any aldehyde or material containing an aldehyde such as the condensation products described above); however, it is preferred to keep their quantity to a minimum in order to minimize costs. Instead of formaldehyde, acetaldehyde, propanal, butanal, benzaldehyde, and others may be used. Alternatively, I may use dialdehydes such as glyoxal or any of the cyclic aldehyde-alkylene oxide condensation products having the formulae set forth in U.S. Patent 2,031,619.

In order to produce a plissé on regenerated cellulose textile fabric materials, it is necessary to heat cure the aldehyde or derivative thereof in situ on the textile fabric materials under conditions such that the aldehyde-containing material reacts chemically with the regenerated cellulose and perhaps also with the cellulose ether. It appears that the cellulose ether coats the individual fibers, giving bulk to the fabric and, upon drying of the solution, may fill in the crossing points of the individual fibers to restrict their relative movements. Upon heat curing it appears that the aldehyde-containing material reacts to some extent with the hydroxyl groups on the cellulose ether and the regenerated cellulose so as to cross-link the two, since the ether cannot then be removed by washing although initially water-soluble.

In order to effect heat curing of the impregnated textile material, the aqueous medium in which the treating composition is applied should contain a curing catalyst. To avoid the use of mineral acids such as $H_2SO_4$ which degrade and embrittle regenerated cellulose, various other known acidic curing catalysts may be utilized. This class of catalyst includes magnesium chloride, diglycollic acid, alkali metal bisulfates such as the bisulfates of sodium, potassium, lithium, etc. These catalysts permit high temperature curing without embrittlement of the filaments. A small amount of sodium sulfate is also included with the bisulfate primarily as a buffer, the two functioning as a catalyst for the cross-linking reaction.

The amount of catalyst to be used varies over a wide range, a working range being about 1 to 10% by weight of catalyst to total weight of aqueous treating solution. With the catalysts of a stronger acid type, i.e. diglycollic acid or the alkali metal bisulfate-sulfate system, 2 to 5% by weight is a preferred range. In both of these systems, pH control in the aqueous treating solution is necessary for best results. Thus with the bisulfate-sulfate system, the pH should vary between about 1.2 and 1.8, preferably 1.3 to 1.4. With diglycollic acid, the pH should vary between about 1.8 and 2.5.

Magnesium chloride hexahydrate is the catalyst of choice since it is mildly acidic only, thus requiring no washing prior to treatment with alkali. For optimum results one should use magnesium chloride hexahydrate in a quantity of at least 5% by weight of the treating solution, with 6 to 10% by weight being preferred. If anhydrous $MgCl_2$ is used, the above 5–10% working range becomes about 2–5%. The only essential limitation on the maximum amount of magnesium chloride (anhydrous or hydrated) permissible is cost, for solutions containing 20% by weight of the hexahydrate have been effectively utilized without detriment to the resulting fabric.

The addition of a lubricant or softening agent in an amount of 0.5–1.5% by weight of the solution is desirable in order to reduce loss in dry abrasion and tear strength. The lubricant may be any wax-like material which is self-emulsifiable in the aqueous treating medium and which is compatible with, and chemically inert to, the remaining ingredients of the medium. Examples are the ethers and esters of polyhydric alcohols containing one or more free hydroxyl groups, and condensates thereof with ethylene oxide containing, for example, from 1 to 50 ethylene oxide units per molecule. This would include the butyl ether of a polyhydric alcohol, such as ethylene glycol mono-butyl ether, a partial ester of an inner anhydride of a polyhydric alcohol with a fatty acid containing, preferably, at least 8 carbon atoms, or condensates thereof with ethylene oxide; it would include a partial ester of such alcohols as sorbitol, mannitol, glycerol, glycol, etc., with a fatty acid such as stearic, oleic, myristic, lauric, etc., or condensates of the esters with ethylene oxide. An effective lubricant comprises a mixture of 50% sorbitan mono-palmitate and 50% sorbitan tristearate containing 16 polyoxyethylene units per molecule. The one most commercially used is polyoxyethylene sorbitan monolaurate. Another is a dialkylketene dimer which when added to the formula in concentrations of 0.5–1.9% will produce a fabric having as much as 100% increase in tear strength over an untreated fabric. In certain instances, the lubricant may be omitted, as for instance when a textile of less pronounced flexibility is desired for any purpose, or when a cellulose ether of low viscosity is used.

Preferably, although not necessarily, a thermosetting resin is also incorporated into the treating solution, broadly an amino-aldehyde condensation product. Such condensates include reaction products of aldehydes as a class, e.g., formaldehyde, paraformaldehyde, acetaldehyde, propionaldehyde, crotonaldehyde, butyraldehyde, benzaldehyde, furfural and the like, with amino compounds as a class, e.g. aliphatic amines, urea, thiourea, methyl urea, acetyl urea, guanidine, melamine, cyanamide, dicyandiamide, biuret, semicarbazide, aniline and aliphatic derivatives thereof. These resins impart to the final plissé fabric a resilience, liveliness and bounce which is appreciably greater than that which results when the resin is omitted. It is believed that the resin adds body to the fabric and in this way makes it more impressionable to the crimping step. This resin is added in the amount of 1–10% by weight depending on the hand or finish characteristics desired in the finish fabric.

In preparing the treating composition, the cellulose ether is diluted with water to about ½ of the final desired volume. This requires mechanical agitation and the water should be added slowly to the ether which is very viscous. In fact mechanical agitation should be employed throughout the entire formulation process. The aldehyde-containing material is added next (e.g. formaldehyde, glyoxal, or one of the condensation products of either U.S. 2,786,081 or 2,031,619) followed by the addition of the lubricant and any of the other finishing additives if desired. All of these additives must be first dissolved in water and added to the cellulose ether-aldehyde solution. The catalyst is dissolved in cold water, say 2 lbs./gallon of water, and the solution added to the cellulose ether-aldehyde-lubricant solution in an amount sufficient to ultimately provide a catalyst concentration within the aforementioned range. The individual solutions (catalyst solution, ether-aldehyde solution, etc.) are preferably of greater concentration than desired in the treating medium and after all of the materials have been mixed, water is added to provide a treating medium having the required solids content.

The mechanical application of the composition to the fabric follows a conventional routine: impregnate, dry, cure and, in some instances, scour (scour before treatment with alkali not being essential when $MgCl_2$ or $$MgCl_2 \cdot 6H_2O$$

is used as a catalyst). Following the impregnation of the fabric as by padding the excess aqueous impregnant is removed, as by passing the impregnated fabric between press rolls so that the impregnated textile material retains from about 75%–95% of the aqueous medium, based upon the weight of the textile material. Preferably the textile fabric is maintained under sufficient tension during its passage through the treating solution to provide a 3–8% stretch. The impregnated material is then dried under tension at a desired fixed dimension by heating to a temperature of about 160° C., whereby the aldehyde-containing material is converted into an insoluble heat-hardened condition. The curing period may vary, for example, from about five minutes at a temperature of 157° C. to two and a half minutes at 162° C. In the case of viscose blended with either acetate or acrylic fibers a milder cure is desirable, e.g., four minutes at 148° C. When using a catalyst other than a mildly acidic one, e.g. magnesium chloride, the textile fabric is washed subsequently or "scoured" in an aqueous medium having a pH of about 9 and containing a detergent and soda ash to neutralize the textile material.

Prior to caustic treatment, the rayon fabric is wet sligthly, to a moisture content of 20–30%, and is then run through a suitable plissé printing machine which may be like those well known for plisséing cotton. Following the application of the caustic soda the later is given time to work (2 to 10 minutes, preferably 5 minutes) then neutralized with a weak or dilute acid, washed, slack dried (hung over horizontal poles on an endless belt going through a drier at 240–280° F.) and then preferably steam framed. In the latter process the fabric is grasped on each side by metal clips mounted on an adjustable frame which then conveys it through a housing where steam is blown through it. The setting of the clips determines the width of the finished cloth and can give it either a shrunken or stretched characteristic depending on the degree of tension. It should of course be framed to a finished width which will hold its dimensions.

The above described process is the so-called direct caustic printing for plisséing cotton goods, but the rayon can also be plisséd by other methods. For example, the resin treated cloth as previously described, can be printed with a resist gum and, after drying the cloth, then padded through a strong caustic soda solution.

Still another method for plisséing the resin treated cloth is by the two roller method of caustic printing. In this case, one roll prints parallel stripes of resist gum while the other prints the caustic soda, the two rolls being so fitted that the caustic stripe falls between alternate stripes of resist gum.

These alternate methods are well known among textile printers for plisséing cotton cloth, but we find that the so-called direct method of caustic printing is the most satisfactory for plisséing rayon.

Example 1

A plain weave 100% rayon fabric suitable for soft shirting was desized and scoured when taken from the loom to remove its tint and starch content. This fabric was then padded through a treating solution of the following composition wherein all percentages are by weight of solution:

| | Percent |
|---|---|
| Cellulose ether | 5.0 |
| Formaldehyde | 3.7 |
| Softener 50% sorbitan monopalmitate–50% sorbitan tristearate | 0.5 |
| Sodium bisulfate | 2.0 |
| Sodium sulfate | 0.5 |
| Water | 88.3 |

The fabric was padded through this treating solution under a tension of 3–8%, pick-up at the pad being about 75–85%. The fabric was then dried on a clip tenter frame by passing air over the fabric at a temperature of 115°–140° C., and then fed to a curing chamber under slight tension where hot air was blown against the fabric for 2½ minutes at 162° C. to condense or cure the formaldehyde. The fabric was then subjected to a neutralizing rinse or scour containing a detergent and sufficient soda ash to give a solution pH of 9–9.5. Securing time was about 15 minutes, the solution being at a temperature of 50°–75° C. The fabric was rinsed in warm water and then cold water for about 5 minutes, squeezed, plaited off, and dried completely. This fabric was then wetted to a 25% moisture content and blended with a solution of 50% NaOH and 50% water, thickened with starch ether, in stripes using an engraved roll. After waiting a few minutes for the caustic to work the fabric was treated with dilute acetic acid to neutralize residual base, then washed. After washing, the fabric was slack-dried (hung over horizontal poles on an endless belt going through a drier for 5 minutes at 240–280° F.) and then steam framed. The fabric taken from the steam frame displayed a good plissé effect or pattern.

Example 2

The process of Example 1 was repeated but this time a cyclic urea-formaldehyde resin was incorporated into the padding solution. The composition of the solution was as follows:

| | Percent |
|---|---|
| Water soluble, hydroxy ethyl cellulose | 5.0 |
| Formaldehyde | 3.7 |
| Cyclic urea-formaldehyde resin | 2.0 |
| Softener (as in Example 1) | .5 |
| Diglycollic acid | 3.0 |
| Water | 85.8 |

When this fabric, after padding, caustic treatment, etc., as in Example 1 was taken from the steam frame it was found to have a plissé effect equal in all respects to cotton plissé and somewhat superior to that obtained from the process of Example 1. Specifically the plissé effect was more pronounced; the fabric was more resilient, more lively and bouncy.

The fabrics from both Examples 1 and 2 were given ten standard sanforized washings, which included 45 minutes at the boil. In both cases, the plissé effect was unchanged, indicating its durability was lasting.

Examples 3–9

| | #3, percent | #4, percent | #5, percent | #6, percent | #7, percent | #8, percent | #9, percent |
|---|---|---|---|---|---|---|---|
| Water Soluble Hydroxyethyl Cellulose | 5 | 5 | 5 | 5 | 5 | 5 | 5 |
| Cross-linking Agent [1] | 8 | 5.5 | 8 | 8 | 8 | 8 | 8 |
| Softener [2] | 0.5 | 0.5 | 0.5 | 0.5 | 0.5 | 0.5 | 0.5 |
| Urea-Formaldehyde Resin | | | 3 | 5 | 7 | | 5 |
| $MgCl_2 \cdot 6H_2O$ | 8 | 6 | 10 | 10 | 10 | | |
| Diglycollic Acid | | | | | | 2.4 | 2.4 |
| Zinc Chloride | | | | | | 0.6 | 0.6 |
| Water | 78.5 | 83 | 73.5 | 71.5 | 59.5 | 83.5 | 73.5 |

[1] Reaction product of Example 1 of U.S. Patent 2,786,081.
[2] 50-50 mixture of sorbitan monopalmitate and sorbitan tristearate.

Each of the above formulations was applied to separate samples of white rayon challis by padding, dried and cured at about 149° C. for 10 minutes as in Example 1. Each treated sample of rayon was then scoured in 0.1% Igepon T and 0.1% soda ash at 60° C. for about 10 minutes, rinsed, extracted and pressed. Each sample was then plisséd as follows:

(a) Pad samples with 100% Rumford plissé gum using special padder for plissé
(b) Steam samples for three minutes
(c) Hang to dry for five minutes
(d) Immerse in 4% acetic acid for three minutes. Squeeze
(e) Immerse in cold water for three minutes
(f) Squeeze and air dry After being plisséd, the samples were cut in two. One-half of each sample was given a scour at 160° F. for 30 minutes in 0.1% Igepon T and 0.1% soda ash, rinsed, and air dryed. All samples were then examined for depth of plissé. There was no significant difference between the scoured and the unscoured samples. In each case, a good plissé effect was produced.

Examples 10–13

| | #10, pounds | #11, pounds | #12, pounds | #13, pounds |
|---|---|---|---|---|
| Water Soluble Hydroxyethyl Cellulose | 10 | 10 | 10 | 10 |
| Cross-linking Agent [1] | 16 | 16 | 16 | 16 |
| Softener [2] | 1 | 1 | 1 | 1 |
| Urea-Formaldehyde Resin | 14 | 14 | 10 | 8 |
| $MgCl_2 \cdot 6H_2O$ | 20 | 20 | 20 | 20 |

$H_2O$ sufficient to bring total volume of each above to 24 gallons.
[1] Reaction product of Example 1 of U.S. Patent 2,786,081.
[2] 50-50 mixture of sorbitan monopalmitate and sorbitan tristearate.

In each of Examples 10 and 11, 90 yards of rayon challis were padded, dried, and cured at about 157° C. for about 5 and 6 minutes respectively as in Example 1. In Example 12, 150 yards of dyed rayon challis were padded, dried, and cured as in Example 11. In Example 13, 175 yards of pigment rayon taffeta were padded, dried, and cured as in Example 11. In each of Examples 10 through 13, the scouring procedure of Example 1 was omitted. The cured fabrics were then wetted and given a plisséing treatment as in Example 1 producing in each instance a very satisfactory rayon plissé. The fabrics of Examples 10–13 were given the sanforized washings given to those Examples 1 and 2. Again the plissé effect proved durable.

Example 14

The procedure of Example 13 was repeated substituting as the cross-linking agent the reaction product of Example 3 of U.S. Patent 2,786,081. The fabric thus treated exhibited an effective and durable plissé effect.

Example 15

The procedure of Example 13 was repeated substituting as the cross-linking agent the reaction product of Example 5 of U.S. Patent 2,786,081 producing a durable effective plissé effect on the treated fabric.

*Example 16*

Example 1 of U.S. Patent 2,786,081 was repeated substituting dibutylene glycol for diethylene glycol. The reaction product thus produced was substituted for that used in Example 13 producing an effective and durable plissé effect on the treated fabric.

The foregoing specification and examples are to be considered as illustrative of the invention, not limiting since various modifications can be made without departing from the spirit of the invention. For example, instead of using a water soluble cellulose ether it is possible to use a water-insoluble, alkali soluble cellulose ether, sulfuric acid being added to reduce the pH of the solution to about 1.2–1.8 and to serve as a catalyst for curing the formaldehyde when the solution is applied to the fabric. This however requires a complex mixing procedure and limits the type of additives which may be included in the formula, and is hence less desirable than use of the water-soluble cellulose ether as previously described.

This application is a continuation-in-part of application Serial No. 554,919, filed December 23, 1955, now abandoned.

I claim:

1. A method of preparing a plissé fabric from a textile fabric formed predominantly of regenerated cellulose which comprises applying to and impregnating the entire textile fabric with an aqueous medium comprising from 1–6% by weight of a water-soluble cellulose ether selected from the group consisting of unsubstituted alkyl cellulose ethers, carboxyalkyl cellulose ethers, hydroxyalkyl cellulose ethers, mixed alkyl hydroxyalkyl cellulose ethers, mixed alkyl carboxyalkyl cellulose ethers and water-soluble alkali metal salts thereof, from about 1–10% by weight of a cross-linking agent selected from the group consisting of aliphatic mono-aldehydes containing from 1–8 carbon atoms and the acetal condensation product of an aliphatic mono-aldehyde containing not more than 8 carbon atoms and at least one dialkylene glycol in which the alkylene radical has from 2–4 carbon atoms, said condensation product containing per molecule at least two dioxyalkylene radicals derived from said dialkylene glycol and at least two alkylidene radicals derived from said aldehyde; and an acidic curing catalyst, drying the impregnated textile fabric under tension at fixed dimensions, curing the dried textile fabric while maintaining said fixed dimensions, relaxing the cured textile fabric and then applying a plissé forming amount of caustic soda to selected spaced areas of said fabric in a plissé forming pattern, neutralizing excess caustic with dilute acid, washing, and drying said fabric.

2. The method of claim 1 wherein the final drying is a slack drying and is followed by stem framing to a finished width which will hold its dimension.

3. The method of claim 1 wherein the catalyst is selected from the group consisting of magnesium chloride, diglycollic acid and sodium sulfate.

4. A method of preparing a regenerated cellulose plissé fabric which comprises applying to and impregnating an entire regenerated cellulose textile fabric with an aqueous medium containing from about 1–6% by weight of a water-soluble hydroxyethyl cellulose ether, from about 1–10% by weight of formaldehyde and 1–10% by weight of an acidic curing catalyst, drying the impregnated fabric under tension at fixed dimensions without curing thermally, curing the dried fabric while maintaining said fixed dimensions and then applying a plissé forming amount of caustic soda to spaced areas of said fabric in a plissé forming pattern.

5. The method of claim 4 wherein said catalyst is magnesium chloride.

6. The method of preparing a regenerated cellulose plissé fabric which comprises applying to and impregnating an entire regenerated cellulose textile fabric with an aqueous medium containing from about 1–6% by weight of a water-soluble hydroxyethyl cellulose ether, from about 1–10% by weight of the acetal condensation product of formaldehyde and diethylene glycol, said product containing per molecule at least two dioxyethylene radicals derived from the diethylene glycol and at least two methylene radicals derived from the formaldehyde, and from 1–10% by weight of an acidic curing catalyst, drying the impregnated fabric under tension at fixed dimensions without curing thermally, curing the dried fabric while maintaining the fixed dimensions, and then applying a plissé forming amount of caustic soda to spaced areas of said fabric to produce a plissé effect.

7. The method of claim 6 wherein said catalyst is magnesium chloride.

8. The method of claim 6 wherein said caustic treatment is followed by the steps of neutralizing excess caustic with dilute acid, washing, slack drying and steam framing.

9. The method of claim 6 wherein a urea-formaldehyde textile resin is added prior to curing.

10. The method of claim 6 wherein the impregnating aqueous medium additionally contains a lubricant consisting of from about 0.5 to about 1.5% by weight of a 50–50 mixture of sorbitan monopalmitate and sorbitan tristearate.

11. A method of preparing a regenerated cellulose plissé fabric which comprises impregnating an entire regenerated cellulose fabric with an aqueous medium containing about 1–6% by weight of a water-soluble hydroxyethyl cellulose ether, about 1–10% by weight of an aldehyde-amine textile resin selected from the group consisting of urea-formaldehyde and melamine-formaldehyde, about 1–10% by weight of the acetal condensation product of formaldehyde and diethylene glycol, said product containing per molecule at least two dioxyethylene radicals derived from the diethylene glycol and at least two methylene radicals derived from the formaldehyde, and about 5–10% by weight of magnesium chloride as an acidic curing catalyst, drying the impregnated textile fabric under tension at fixed dimensions without thermally curing, then curing the dried fabric while maintaining said fixed dimensions, applying an aqueous solution containing a plissé forming amount of caustic soda to spaced areas of said fabric in a plissé forming pattern, and, after the fabric puckers, neutralizing the residual caustic soda and washing said fabric.

References Cited in the file of this patent

UNITED STATES PATENTS

| | | |
|---|---|---|
| 2,031,619 | Seymour | Feb. 25, 1936 |
| 2,118,685 | Stadler | May 24, 1938 |
| 2,244,767 | Corbett et al. | June 10, 1944 |
| 2,360,477 | Dahle | Oct. 17, 1944 |
| 2,412,832 | Pfeffer | Dec. 17, 1946 |
| 2,436,076 | Pfeffer | Feb. 17, 1948 |
| 2,441,859 | Weisberg et al. | May 18, 1948 |
| 2,512,195 | Bener | June 20, 1950 |
| 2,628,151 | Walmsley | Feb. 10, 1953 |
| 2,785,947 | Kress et al. | Mar. 19, 1957 |
| 2,786,081 | Kress | Mar. 19, 1957 |
| 2,810,624 | Wardell | Oct. 22, 1957 |

FOREIGN PATENTS

| | | |
|---|---|---|
| 450,620 | Great Britain | July 21, 1936 |
| 471,988 | Great Britain | Sept. 15, 1937 |
| 634,634 | Great Britain | Mar. 22, 1950 |

OTHER REFERENCES

Matlin: Industrial and Engineering Chemistry, September 1955, pp. 1729–1733. (Copy in Patent Office Library.)